F. C. MAEGLY.
DISPLAY DEVICE FOR CAR WEIGHTS.
APPLICATION FILED MAR. 28, 1912.
1,221,464.
Patented Apr. 3, 1917.
6 SHEETS—SHEET 2.
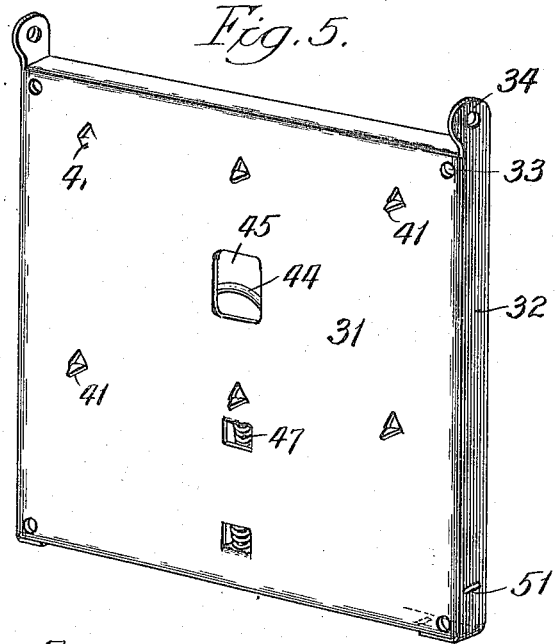
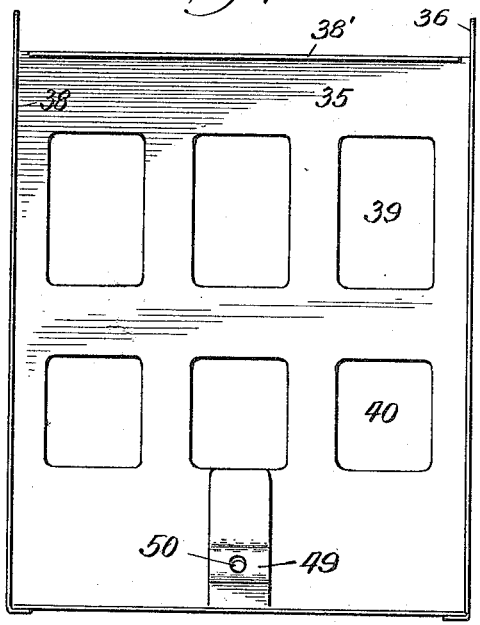
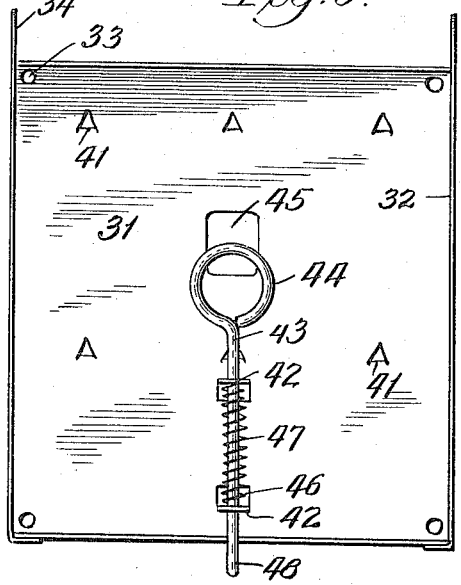
Witnesses:
John Enders
Henry A. Parks
Inventor:
Frederick C. Maegly,
by Sheridan, Wilkinson, Scott & Richmond.
Attys

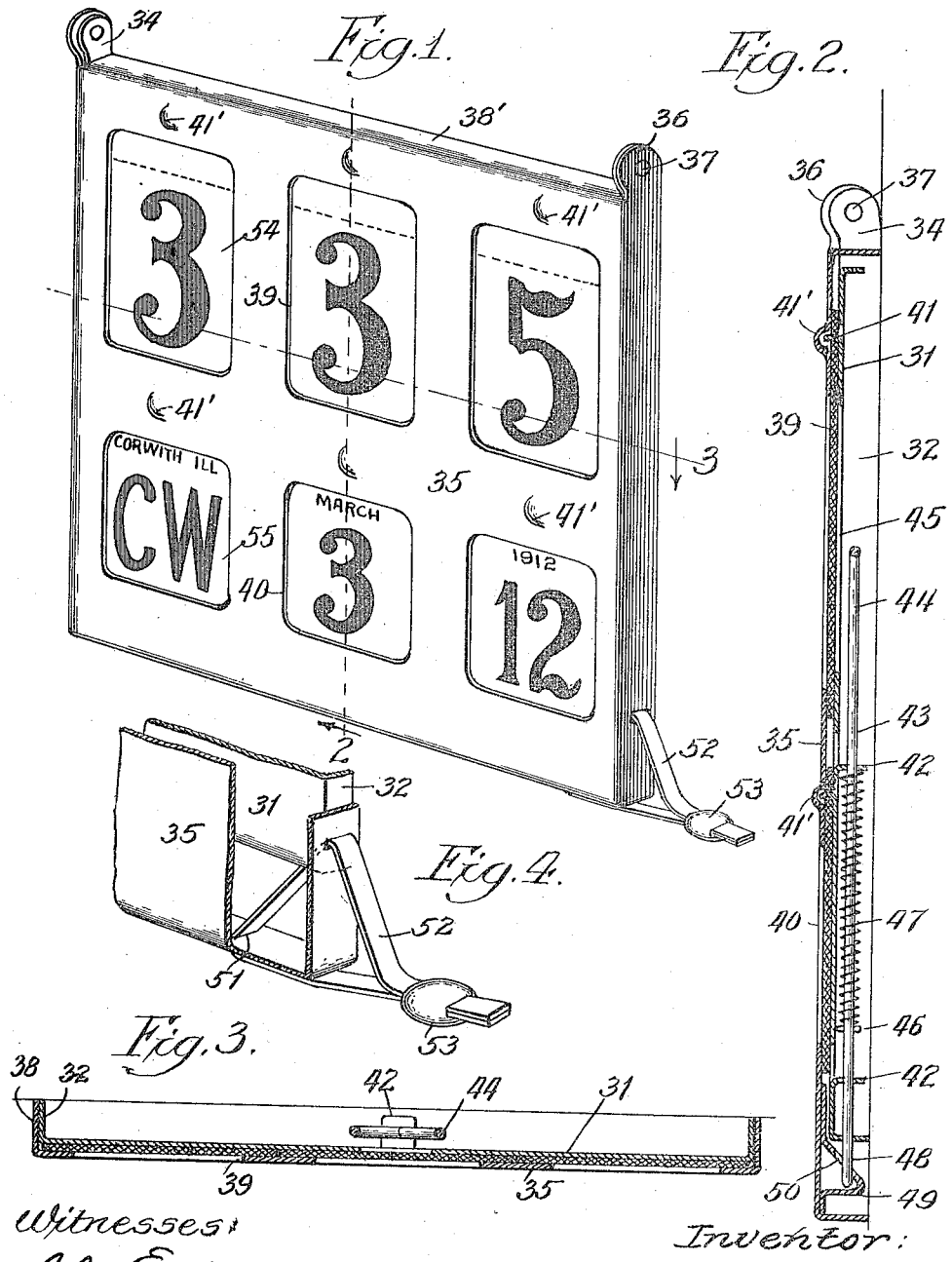

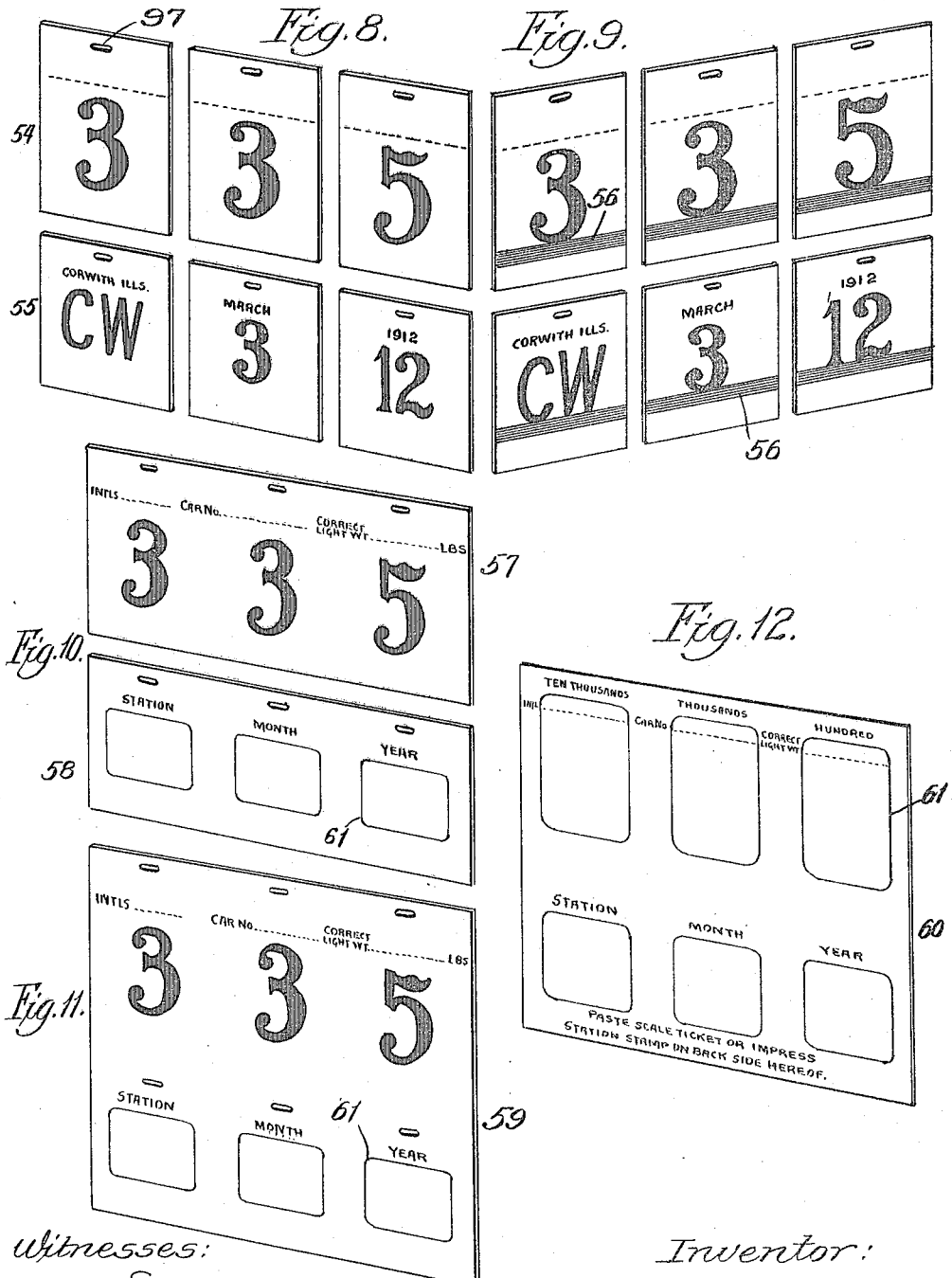

F. C. MAEGLY.
DISPLAY DEVICE FOR CAR WEIGHTS.
APPLICATION FILED MAR. 28, 1912.
1,221,464.
Patented Apr. 3, 1917.
6 SHEETS—SHEET 4.
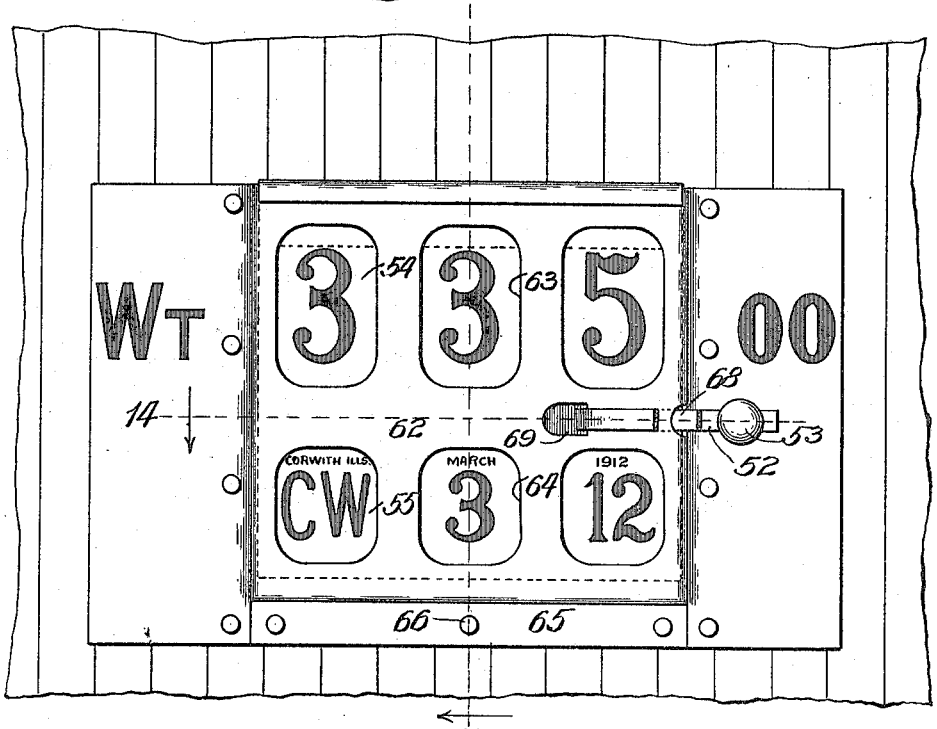
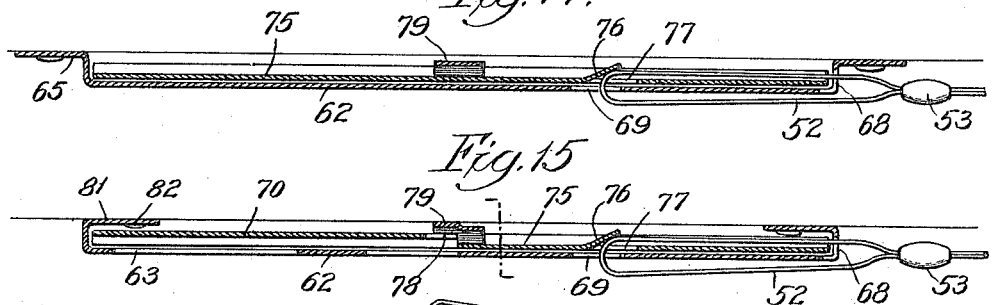
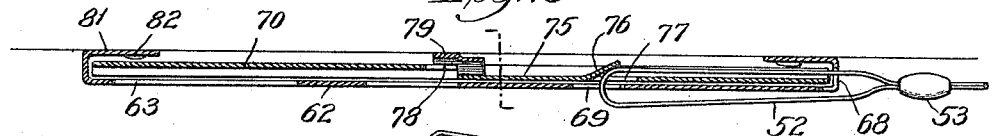
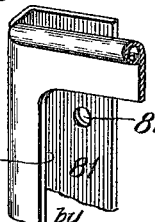

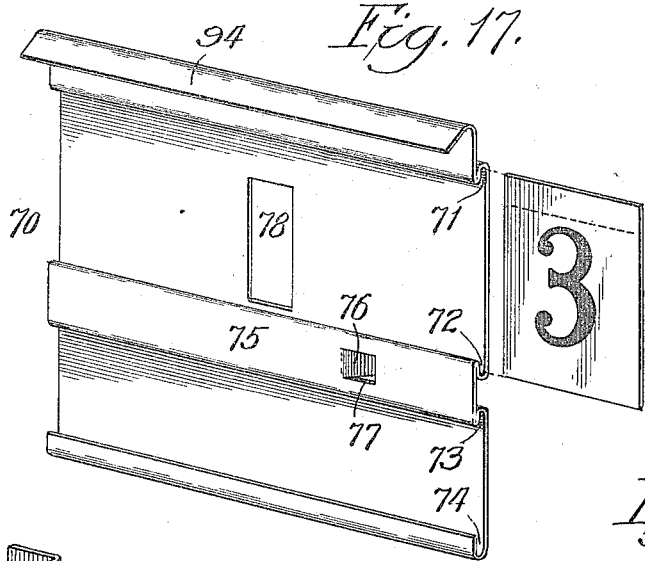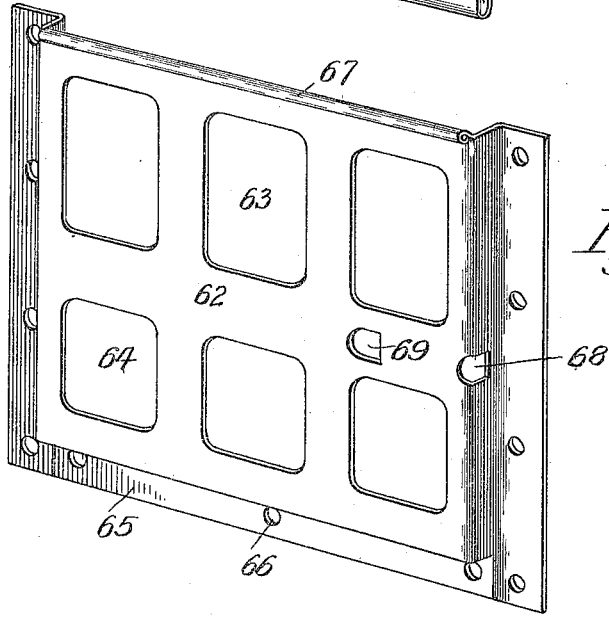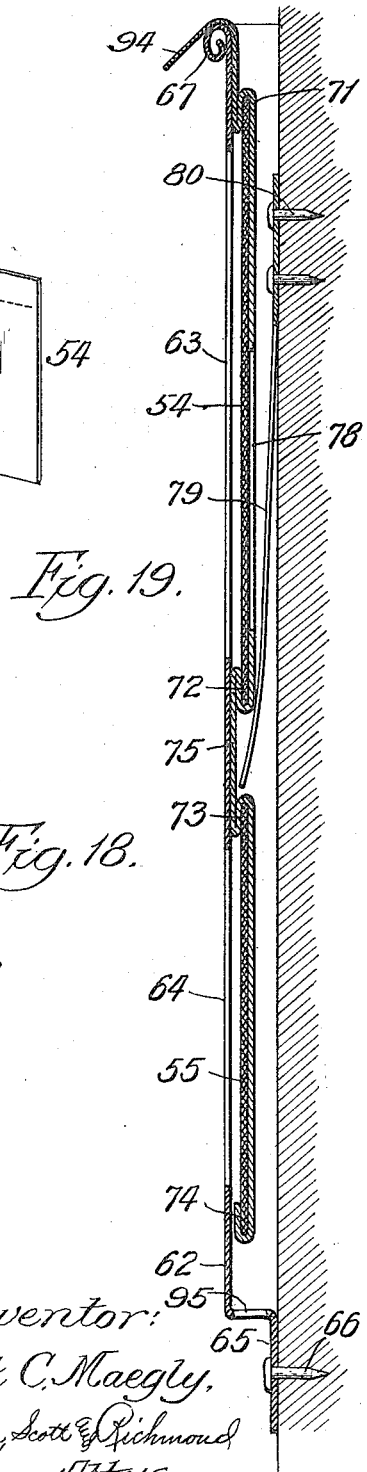

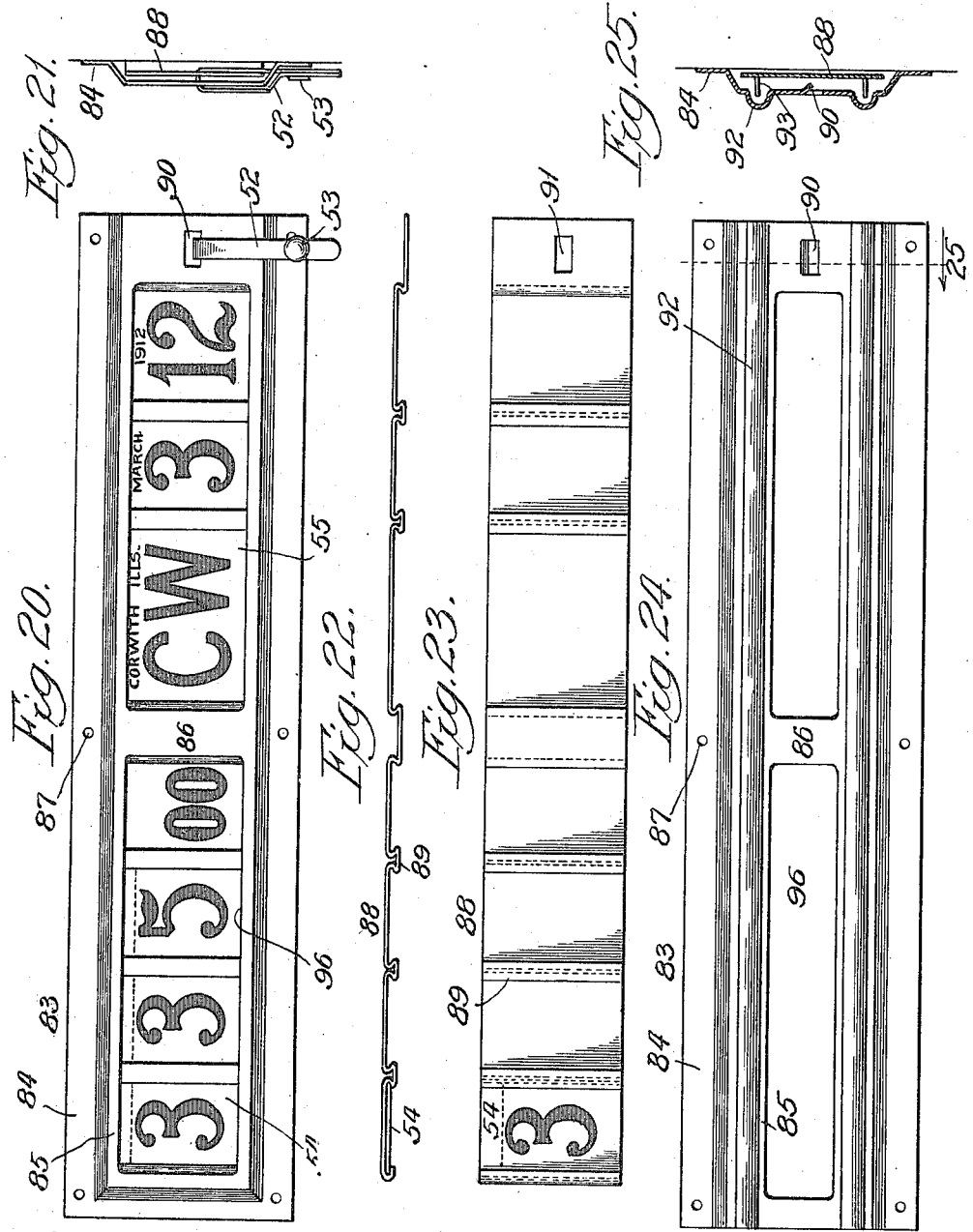

UNITED STATES PATENT OFFICE.

FREDERICK C. MAEGLY, OF CHICAGO, ILLINOIS.

DISPLAY DEVICE FOR CAR-WEIGHTS.

1,221,464.  Specification of Letters Patent.  Patented Apr. 3, 1917.

Application filed March 28, 1912. Serial No. 686,956.

*To all whom it may concern:*

Be it known that I, FREDERICK C. MAEGLY, a citizen of the United States, residing at Chicago, in the county of Cook and State of Illinois, have invented certain new and useful Improvements in Display Devices for Car-Weights, of which the following is a specification.

One object of my invention is to provide apparatus by which the light weights of freight cars can be exhibited on their outer side walls with security against alteration by unauthorized persons, and with facilities for making corrections by authorized persons when desirable. Another object is to provide such a device in which changes may be made by authorized persons in the shortest practicable space of time, reducing the cost of such service and insuring accuracy in the tare weights posted on the sides of freight cars.

More particularly my invention consists of a holder adapted to display cards or plates with numerals thereon indicating the light weights of the freight cars and certain data in connection therewith. One object of my invention is to provide such a holder with means for sealing it up so that the arrangement of the cards therein cannot be disturbed without breaking the seal. Still another object of my invention is to make such a holder that shall permit quick and easy arrangement of the cards or plates, so that a revision of the light weights can be effected readily by breaking its seal, taking out the old tare weight information, and substituting the revised tare weight information whenever the cars are re-weighed and changes are necessary. Such alteration may be effected by means of my invention without detention to the station employees or the yard or train crews, as is now necessary with the existing appliances.

All the foregoing objects, and many others, will be made apparent in the following specification and claims, taken in connection with the accompanying drawings, in which—

Figure 1 is a perspective view of one form of my improved device.

Fig. 2 is a vertical section on the line 2 of Fig. 1.

Fig. 3 is a horizontal section on the line 3 of Fig. 1.

Fig. 4 is a perspective view of a detail, certain parts being broken away to show this more clearly.

Fig. 5 is a perspective view of the inner member of the device shown in complete form in Fig. 1.

Fig. 6 is a rear view of this same inner member.

Fig. 7 is a rear view of the outer member of the same device.

Fig. 8 is a perspective view of a set of cards that may be employed with the same device.

Fig. 9 is a perspective view of the back faces of these cards.

Fig. 10 is a perspective view of an alternative set of cards.

Figs. 11 and 12 are perspective views of other alternative forms of the cards.

Fig. 13 is an elevation of a modified embodiment of my invention.

Fig. 14 is a horizontal section of the same on the line 14 of Fig. 13.

Fig. 15 is a horizontal section of a further modification, the left hand part of the section being taken on a higher plane than the right hand part.

Fig. 16 is a perspective view of a detail of this further modification.

Fig. 17 is a perspective view of an inner slide or carrier which forms a part of the device of Fig. 13.

Fig. 18 is a perspective view of the frame for the same device.

Fig. 19 is a vertical section taken on the line 19 of Fig. 13.

Fig. 20 is an elevation of a further modified embodiment of my invention.

Fig. 21 is an end elevation of the same.

Fig. 22 is a top edge view of the carrier for the device of Fig. 20.

Fig. 23 is an elevation of the same carrier.

Fig. 24 is an elevation of a frame for a still further modified form of my invention.

Fig. 25 is a vertical section of the same on the line 25 of Fig. 24.

As is well known, it is now the common practice to stencil the light weights of all freight cars on their outer walls. In computing the freight charge due the railroad company for carrying freight in a car, it is the common practice to obtain the weight of the car with its load, and to subtract therefrom the light weight stenciled on the car: the difference is taken to be the true weight of the load, and the shipper is charged accordingly. The law requires that the carrier shall collect no more or no less than its published tariff, which is invariably indicated by a rate per one hundred (100) pounds or per ton. It therefore follows that the feature of currently reliable tare weights on freight cars is of vital importance,—heavy penalties being prescribed for the carrier's negligence or failure to assess freight charges upon the correct basis.

If the light weights of cars could be determined with absolute certainty, and if they were invariable after having been once determined and stenciled, there would be little need for my invention. But, in course of time, the light weight of a freight car is almost sure to change to a considerable extent. This is due to a variety of causes, some of which may tend to increase the weight, while others may tend to decrease it. For example, the lumber used in the construction of a car may grow drier as it ages, thus decreasing the weight. Repairs or alterations, temporarily or permanently applied to the woodwork or the ironwork of the car, may give either an increase or decrease of weight. The accumulation of refuse in concealed places and its periodical removal are also factors. Hence, it becomes necessary to determine the light weights of freight cars at frequent intervals, so as to take account of these changes. The delays to equipment, the large volume of additional switching entailed, and the resulting congestion of crowded freight yards, to say nothing of the increased expense, are factors so prejudicial as to render ineffective and incomplete the performance of this necessary service by the carriers generally. The objection lies not alone in the discrepancy of the light weight now stenciled upon many of the cars, but also in the fact that all light weights on freight cars are subjected to suspicion because of the general knowledge, both on the part of the carrier and the shipper, that the existing means and appliances are inadequate.

When it is desired to redetermine the light weight of a car and to re-stencil the same, the usual procedure is to search indiscriminately through freight yards for cars with marked tares seeming to justify suspicion and then designate the same to be sorted out from among the other cars and switched to the scale and light weighed. After being light weighed and a record or memorandum of the weight is taken, such cars must again be switched from the scale to some other convenient place where they will not be in the way or obstruct the current operation of the yard while being held for the necessary alteration of the tare weight marks. After the car is weighed, a memorandum of the weight record must then be given to the painter, who afterward hunts the car out in the yards and paints over the old light weight, leaving it to dry. Thereafter, usually the next day, he goes to the same car, which in the meantime may have been switched to another part of the yard, and stencils thereon the new light weight. In many instances the demand for equipment is such that the cars so light weighed, and which are being held for re-painting of their tares, have to be forwarded before the painter can reach them, thus sacrificing all of the labor and expense already incurred. It is obvious that the method thus practised involves considerable loss of time, both for the car, the workmen, and the switching crews, and that it requires much extra switching and is attended with many difficulties and many uncertainties.

I have invented a holder which is adapted to display cards or plates with numerals and other symbols thereon. This holder can have the proper cards or plates placed in it to display the light weight of the car, name of railroad, symbol indicating place where weighed, and the date of weighing. Then it can be sealed up, all this being done by the weighmaster at the very time he weighs the car, with scarcely any additional labor or expense and with substantially no delay to the train or switching crews who are present when the cars are placed upon the scale for the purpose of being light weighed. I preferably employ cards indicating the year and the month when the weighing takes place, the name of the railroad under whose supervision the service is performed, and also the station symbols to indicate where the weighing is done. These cards are to be employed in addition to the cards indicating the light weight. Thus, it will be seen that with hardly any additional labor on the part of the weighmaster the new revised light weight, station symbols, and date can be substituted and displayed upon the car at the very time the new light weight is ascertained, so that the car may remain continuously in the service, thereby avoiding the delays incident to the present practice. In other words, by means of my invention it is practicable without delay to change the light weights of any car arriving empty at the scale for any purpose or under any circumstances whatsoever.

Referring to that form of my invention disclosed in Figs. 1 to 12, inclusive, a sheet metal plate 31 of rectangular form has its edges 32 bent back and the plate is secured to the side wall of the freight car by nails or screws through the corner holes 33. Lugs 34 with holes therethrough project up at the opposite corners of the plate 31.

An outer plate 35, also of rectangular form, has its side edges 38 bent back so that they surround the inner plate 31. At the upper corners these side edges 38 are prolonged in perforated lugs 36, and rivets 37 engaging the lugs 34 and 36 form a pivot or hinge joint at the upper part of the device.

The outer plate 35 has a series of approximately rectangular holes or windows 39 across its upper part and a similar series of such holes 40 across its lower part. The inner plate 31 has rows of pointed lugs or studs 41 struck outwardly therefrom, and the outer plate 35 has bosses 41' to register therewith. Two other lugs 42 are struck back from the plate 31 and perforated, and a bolt 43 passes through both of them. This bolt 43 has its upper end shaped as a ring in front of which is an opening 45 in the plate 31. The bolt 43 is surrounded by a coil spring 47 between the lugs 42 which acts between the upper lug 42 and the cross pin 46. The lower end 48 of the bolt is adapted to engage the hole 50 in the inclined face of a catch member 49 that is attached to the outer plate 35.

The back-turned lip 38' across the top of the device acts as a water shed and prevents water from going down between the members 31 and 35.

Alining slits 51 in the turned-back edges 32 and 38 of the respective plates 31 and 35 may be engaged by a sealing strip 52 and secured by the seal 53.

The cards 54 and 55 have holes 97 adjacent to their upper edges by which they may be hung upon the studs 41 in such position that when the outer plate 35 is closed down the characters inscribed on said cards will show through the openings 39 and 40. The large numerals on the cards 54 indicate the light or tare weight of the freight car expressed in hundreds of pounds. The lower cards 55 indicate in order from left to right the station (C W standing for Corwith, Illinois) at which this weight was determined and the month and year of such determination. Additional legends as shown may be printed in smaller type on the cards to identify them or afford further data. Dotted lines are provided at the tops of the cards 54 on which the railroad initials, the car number and the car weight may be written. The same characters are printed on the back sides of the cards, as shown in Fig. 9, and in addition each card has a blank band 56 across its back face. These reversed sides of the cards are used when there is something doubtful about the determination of the light weight, as, for example, if the car is wet when it is weighed. Thus the cards when exposed as shown in Fig. 9 indicate that no great reliance should be placed upon their readings.

Each weighing station is supposed to have a complete assortment of these cards printed with all possible numbers or other characters that may be needed.

When a car is light weighed at a weighing station the device shown in Fig. 1 is opened by breaking the seal strip 52 and by taking a sharp instrument, such as an awl, punching it through the central card 54 and through the hole 45 behind the same and engaging the ring 44: then by lifting up on the ring 44 the lower end 48 of the bolt 43 may be disengaged from the catch member 49 and the outer plate can be swung out and up on its hinge pivots 37. The operator will then remove the cards 54 and 55 and replace them with suitable cards to indicate the light weight and place and date of their determination by him. Then he will shut the cover 35 down and the bolt 43 will automatically snap into the hole 50 of the catch member 49. Afterward he can apply a sealing strip 52 and seal 53.

It will be seen that the bolt 43 can be disengaged from the catch member 49 only by mutilating the central cards 54 and that such mutilation will be obvious to one glancing at the device. Moreover, to one unfamiliar with the device it will not be apparent how it can be opened.

The sealing strip 52 and seal 53 may be omitted if thought best, but whether they are used or not, the device will only on rare occasions be tampered with by idle meddlesome persons and even if they do tamper with it any change in its indication cannot be made without mutilating one of the cards and thus arousing suspicion.

The cards 57 and 58 shown in Fig. 10 combine the sets shown in Fig. 8. The upper card 57 is printed like the cards 54, but the lower card 58 has blank outlines 61 within which the appropriate data may be written. In Fig. 11 the combination of the cards is carried still further so that a single printed card 59 is provided with blank outlines 61 below.

The card 60 in Fig. 12 is made with blank outlines 61, which indicate the spaces that will show through the openings 39 and 40. The weighmaster can write within the proper spaces the figures and symbols on the cards 60, in case he has no printed cards with the proper characters thereon. The legends on card 60 are self explanatory. Instead of this card I may use an envelop of the same size printed the same on its face and the scale ticket can be placed within this envelop.

Referring to the modification illustrated in Figs. 13, 14, 17, 18 and 19, this comprises an outer plate or frame 62 having a flange 65 at its side edges and lower edge with holes 66 by which it may be secured to the side wall of the freight car by means of nails or screws. This plate 62 stands out a little from the car wall and has holes or windows 63 and 64 and its top edge is stiffened by being rolled over, as designated 67. Within is a carrier 70 of sheet metal crimped as shown in Fig. 17, the grooves 71 and 72 being adapted to receive the top and bottom edges, respectively, of cards 54 and the grooves 73 and 74 being similarly adapted for the lower cards 55. The intermediate crimp 75 has a tongue 76 bent back leaving the hole 77. The outer frame 62 has alining holes 68 and 69 and through all of these holes a sealing strip 52 may be passed and secured by a seal 53. The upper edge of the carrier 70 is bent forward, as designated by 94. The carrier 70 has a central hole 78 behind which is a leaf spring 79 having its upper end attached to the car wall by nails or screws 80. This leaf spring 79 normally hangs down with its free end engaging the intermediate crimp 75.

In this device it will be seen that the carrier 70 can be properly and conveniently removed from the frame 62 only by punching through one of the cards 54, thereby mutilating it, and through the hole 78, thus pushing down the leaf spring 79, so that its lower end will disengage the crimp 75; then by seizing the lip 94 the carrier can be pulled out of the frame 62.

After the carrier 70 has been removed from the frame 62, the cards 54 and 55 can be replaced to indicate the light weight as last determined. Then the carrier can be put back into the frame 62 and the leaf spring 79 will snap into the crimp 75, so as to hold the parts in place.

For further security and assurance that the light weights as displayed are authentic, the seal strip 52 and the seal 53 may be used.

In the modification shown in Figs. 15 and 16, the flange is turned inwardly instead of outwardly, as designated by 81. In this case the holes 82 for the nails are so placed as to be accessible through the openings 63 and 64, so that the nails can be driven through said openings. The heads of these nails will, of course, be covered by the carrier 70, so that they will be inaccessible when the carrier is in place.

Referring now to the modification shown in Figs. 20, 21, 22 and 23, this has a frame 83 with its central part 85 struck out from the car wall, to which it is attached by nails through the holes 87 in the flanges 84. The openings 96 are formed in the part 85 so as to leave a strengthening piece 86, as shown in Fig. 20. The carrier 88 has the form shown in Figs. 22 and 23 with series of crimps 89 forming seats for the cards. Registering holes 90 and 91, respectively in the frame 83 and in the carrier 88 provide for the application of the sealing strip 52 and seal 53.

In the modification shown in Fig. 24, the frame 83 has grooves 92 struck outwardly, and prongs 93 on the carrier 88 stick into these grooves 92. These prongs 93 are adapted to have the cards hung on them.

In all of the forms herein disclosed the usual weighmaster's scale ticket may be placed within the device behind the cards when they are assembled. This scale ticket is made out on a printed form and will be signed by the weighmaster and will give the full data, such as the light weight of the car, the condition of the car weight, as whether wet or loaded with refuse, &c., and the place and date where it is weighed. Accordingly, any person who cares to verify the weights indicated by the device can, by opening it up, get hold of this scale ticket and see whether the indications correspond therewith. This slip fixes responsibility for getting the weight correct, so that if a weight should be wrong, the person who wrongly determined it could be readily ascertained.

Each weighmaster should preferably have on hand sets of printed cards, so that he can promptly fill in the proper cards to indicate any weight that he may determine, and similarly for the other cards indicating the station, symbol and the date. Additional blank cards should be on hand so that in case the printed cards are exhausted, the proper weights can be written in on the blank cards. It will be seen that with my invention the light weight of a car with the station symbol and date can be displayed immediately upon the car after it is weighed, or at any convenient time thereafter. The process of displaying a revised light weight is so easy that I believe cars will be more frequently light weighed and the indications kept up in accordance with their condition better than is the practice where the indications have to be painted on the cars.

The form of my invention shown in Figs. 1 to 7 of this application is claimed specifically in my co-pending application, Serial No. 765,015, filed May 2, 1913.

I claim:

1. In a device of the class described, a frame to be attached to the side of a freight car, a carrier adapted to slide within said frame, display information cards adapted to fit within said carrier, said carrier having a crimp intermediate its sides and ends with a hole therethrough, said frame having a hole adapted to register with the hole in said crimp, and a seal adapted to pass through both said holes.

2. In a device of the class described, a frame to be attached to the side wall of a freight car, a sheet metal carrier to fit within said frame, said carrier being provided with means to receive and hold information cards, said frame having holes therethrough to display said cards, and means to automatically fasten and hold said carrier within said frame.

3. In a device of the class described, a frame to be attached to the side wall of a freight car, a sheet metal carrier to go within said frame, said carrier being crimped to form grooves to receive cards and said frame having holes to display said cards therethrough, and a leaf spring attached to the wall of the freight car behind the said frame and adapted to engage one of said crimps when the carrier is in place therein.

4. In a device of the class described, a frame to be attached to the side wall of a freight car, a sheet metal carrier to go within said frame, said carrier being crimped to form grooves to receive cards, cards seated in said grooves, said frame having holes to display said cards therethrough, and a leaf spring attached to the wall of the freight car behind the said frame and adapted to engage one of said crimps when the carrier is in place therein, said carrier having a hole behind one of said cards and in front of said leaf spring.

5. In a device of the class described, a sheet metal frame having its edges turned under and having large holes through its main part and smaller holes in the edges accessible through said large holes to attach the same to the side wall of a freight car in combination with a sheet metal carrier to go within said frame, said carrier being adapted to hold cards and display the same through the large holes in the frame.

6. In a device of the class described, a member adapted to be attached to the wall of a car with the body portion thereof spaced outwardly from said wall, a relatively movable member adapted to be inserted between said car wall and said body portion of said first named member, an information car carried by said relatively movable member, said first named member having an opening in the body portion thereof to display said card, and means located behind said card to secure said relatively movable member in operative position with respect to said first named member, said locking means being capable of being actuated to release said relatively movable member after said card has been broken.

7. In a device of the class described, a card holder comprising a fixed member and a relatively movable member, an information card supported by one of said members, the other of said members having an opening therethrough to display said card, and a leaf spring arranged to engage automatically a part of said relatively movable member to hold the same in operative position with respect to said fixed member, said leaf spring being located behind said card and being capable of being actuated to release said relatively movable member after said card has been broken.

8. In a device of the class described, a sheet metal frame having its main part formed with large holes therethrough and its edges offset from the plane of the main part and adapted to be fastened to the side wall of the freight car, whereby the main part of the frame will be spaced away from the wall, a sheet metal carrier to slide within said frame, said carrier having crimps formed therein, display information cards adapted to have their edges go under said crimps, and automatic means to fasten and hold the carrier in the frame.

9. In a device of the class described, a frame having a body portion and an open edge and adapted to be secured to a car wall, said frame having said body portion and said open edge thereof spaced from said car wall and having its other edges secured to said car wall, a detachable carried adapted to slide between the body portion of the frame and the car wall, said carrier having crimps therein to receive and support a series of cards, and said frame having a series of openings in the body portion thereof arranged to register with said cards, and means to fasten said carrier within said frame.

10. In a device of the class described, a sheet metal frame to be secured to a freight car and spaced therefrom between its edges, a sheet metal carrier adapted to slide between said frame and said car, said carrier having an outwardly turned lip along its upper edge adapted to engage said frame, said frame having openings therethrough and said carrier being adapted to hold information cards in registry with said openings, and means to automatically lock said carrier in said frame.

In testimony whereof, I have subscribed my name.

FREDERICK C. MAEGLY.

Witnesses:
CARL A. RICHMOND,
HENRY A. PARKS.

Copies of this patent may be obtained for five cents each, by addressing the "Commissioner of Patents, Washington, D. C."